US006888521B1

(12) United States Patent
Richards

(10) Patent No.: US 6,888,521 B1
(45) Date of Patent: May 3, 2005

(54) INTEGRATED DRIVER FOR USE IN DISPLAY SYSTEMS HAVING MICROMIRRORS

(75) Inventor: Peter W. Richards, Menlo Park, CA (US)

(73) Assignee: Reflectivity, INC, Sunnyvale, CA (US)

( * ) Notice: Subject to any disclaimer, the term of this patent is extended or adjusted under 35 U.S.C. 154(b) by 0 days.

(21) Appl. No.: 10/698,290

(22) Filed: Oct. 30, 2003

(51) Int. Cl.[7] .......................... G09G 3/34; G02F 1/03; G02B 26/00

(52) U.S. Cl. .......................... 345/84; 359/242; 359/290

(58) Field of Search ................................ 359/237, 242, 359/290, 291, 295; 345/84, 85, 31, 108

(56) References Cited

U.S. PATENT DOCUMENTS

| | | | | |
|---|---|---|---|---|
| 4,638,309 | A | 1/1987 | Ott | 345/84 |
| 5,079,544 | A | 1/1992 | DeMond et al. | 345/84 |
| 5,132,928 | A | 7/1992 | Hayashikoshi et al. | 365/185.13 |
| 5,254,980 | A | 10/1993 | Hendrix et al. | 345/84 |
| 5,255,100 | A | 10/1993 | Urbanus | 348/441 |
| 5,382,961 | A | 1/1995 | Gale, Jr. | 345/108 |
| 5,444,566 | A | 8/1995 | Gale et al. | 359/291 |
| 5,453,778 | A | 9/1995 | Venkateswar et al. | |
| 5,504,504 | A | 4/1996 | Markandey et al. | |
| 5,510,824 | A | 4/1996 | Nelson | |
| 5,523,803 | A | 6/1996 | Urbanus et al. | 348/771 |
| 5,526,172 | A | 6/1996 | Kanack | |
| 5,548,301 | A | 8/1996 | Kornher et al. | 345/85 |
| 5,592,188 | A | 1/1997 | Doherty et al. | |
| 5,608,468 | A | 3/1997 | Gove et al. | |
| 5,610,624 | A | 3/1997 | Bhuva | |
| 5,754,217 | A | 5/1998 | Allen | |
| 5,903,248 | A | 5/1999 | Irwin et al. | 345/90 |
| 6,046,840 | A | 4/2000 | Huibers | |
| 6,107,979 | A | 8/2000 | Chiu et al. | 345/84 |
| 6,115,083 | A | 9/2000 | Doherty et al. | 348/771 |
| 6,232,936 | B1 | 5/2001 | Gove et al. | |
| 6,344,672 | B2 | 2/2002 | Huffman | 257/296 |
| 6,388,661 | B1 | 5/2002 | Richards | |
| 6,421,285 | B2 | 7/2002 | Matsuzaki et al. | 365/200 |
| 6,809,977 | B1 | 10/2004 | Richards | |
| 2001/0040675 | A1 | 11/2001 | True et al. | |
| 2002/0054031 | A1 | 5/2002 | Elliott et al. | 345/204 |
| 2002/0085438 | A1 | 7/2002 | Wolverton | 365/200 |
| 2002/0138688 | A1 | 9/2002 | Hsu et al. | 711/105 |
| 2003/0137501 | A1 | 7/2003 | Richards | |
| 2004/0125346 | A1 | 7/2004 | Huibers | |

OTHER PUBLICATIONS

Kompenhouwer, et al., Optimally Reducing Motion Artifacts in Plasma Displays, Phillips Research Laboratories, SID 00 Digest, pp. 388–391, year 2000.

Baker, et al., CMOS Circuit Design, Layout and Simulation, IEEE Press Series on Microelectronic Systems, IEEE Press, New York, pp. 345–349, date N/A.

*Primary Examiner*—Georgia Epps
*Assistant Examiner*—Jack Dinh
(74) *Attorney, Agent, or Firm*—Gregory R Muir

(57) ABSTRACT

An integrated driver for controlling operations of display systems having spatial light modulators that are operated in binary states is provided.

5 Claims, 6 Drawing Sheets

INTEGRATED DRIVER FOR USE IN DISPLAY SYSTEMS HAVING MICROMIRRORS

TECHNICAL FIELD OF THE INVENTION

The present invention is related generally to the art of digital display systems, and, more particularly, to controlling techniques and apparatus for the display systems employing spatial light modulators.

BACKGROUND OF THE INVENTION

The current digital display systems having micromirror arrays or other similar spatial light modulators such as ferroelectric LCDs, uses pulse-width-modulation (PWM) to achieve various levels of light intensity on each of the pixels of the spatial light modulator. Full-color images may be created by using the PWM method on separate SLMs for each primary color, or by a single SLM using a field-sequential color technique.

For addressing and controlling the states of the micromirrors, each micromirror of the spatial light modulator is associated with a memory cell circuit that stores a bit of data that determines the ON or OFF state of the micromirror. In order to achieve various levels of perceived light intensity by human eyes using PWM, each pixel of a grayscale image is represented by a plurality of data bits. Each data bit is assigned a significance. Each time the micromirror is addressed, the value of the data bit determines whether the addressed micromirror is on or off. The bit significance determines the duration of the micromirror's on or off period. The bits of the same significance from all pixels of the image are called a bitplane. If the elapsed time the micromirrors are left in the state corresponding to each bitplane is proportional to the relative bitplane significance, the micromirrors produce the desired grayscale image.

In practice, the PWM coding, the color filler cycling and the operations of other components of the display systems, such as image data processing and loading the processes data into the spatial light modulator to produce the desired images or videos must be coordinated with each other.

Therefore, a control unit is desired to control the operation of the display system.

SUMMARY OF THE INVENTION

An integrated driver is provided for controlling operation of display systems having spatial light modulators (e.g. micromirror arrays, liquid crystal display, liquid and crystal on silicon) that operate in binary states and other type of display systems not using spatial light modulators such as organic light-emitting diodes that operate in binary states.

In an embodiment of the invention, a display system is provided. The system comprises: a light source providing a light beam; a spatial light modulator, further comprising: an array of micromirrors for reflecting the light beam; an array of electrodes and memory cells for driving the micromirrors to reflect the light beam according to a set of bitplane data of an image stored in the memory cells; and a set of circuitry providing the set of bitplane data and a first set of control signals sufficient for the electrodes and memory cells to drive the micromirrors so as to produce the image, the first set of control signals being provided in accordance with a second set of control signals received by the circuitry; an integrated driver built on a single chip providing the bitplane data of the image and a third set of control signals comprising the second set of control signals; and an optical element for steering the light beam.

In yet another embodiment of the invention, a projector is provided. The projector comprises: a light source providing a light beam; a spatial light modulator comprising an array of the micromirrors that reflect the light beam according to a set of bitplane data of an image under a control of a first set of control signals so as to produce an image; an integrated driver built on a single chip providing the set of bit plane data and the first set of control signals; and imaging optics for projecting the reflected light beam onto a display target.

In yet another embodiment of the invention, a method of producing an image using a display system having a spatial light modulator that comprises an array of micromirrors that are individually movable is disclosed. The method comprises: initializing, by a control unit of an integrated driver, the display system, further comprising: sending a set of initializing data to a first bus of the control unit; transmitting the initializing data to a second bus of a data processing unit of the integrated driver through a bridge that links the first and second buses; loading a sequence of image data of the image into the data processing unit; transforming the image data into a sequence of bitplane data; delivering a set of display data comprising a set of display control signals and the bitplane data into a display control unit of the spatial light modulator; in accordance with the display control signals, the display control unit sending the bitplane data to an array of memory cells, each of which is associated with a micromirror for deforming the micromirrors so as to produce the image.

In yet another embodiment of the invention, a spatial light modulator for use in display systems is disclosed. The spatial light modulator comprises: an array of micromirrors, each of which is operable to rotate; an array of electrodes, each of which is associated with a micromirror of the micromirror array; an array of memory cells, each of which is connected to an electrode of the electrode array; a plurality of bitlines, each of which is connected to a memory cell for updating the memory cells; a first and second sets of wordlines connected to the memory cells for activating the memory cells, wherein the memory cells of a row of the memory cell array are separately connected to a first wordline from the first wordline set and a second wordline from the second wordline set; and a mirror driver in connection with the bitlines and the first set of wordlines, further comprising: a control unit providing a wordline control signal that selectively activates and deactivates the wordlines from the first and second sets of the wordlines.

In yet another embodiment of the invention, a method for driving an array of micromirrors of a spatial light modulator used in a display system, wherein the spatial light modulator comprises an array of micromirrors, each of which being associated with an electrode of an array of electrodes, each electrode being connected to a memory cell of an array of memory cells is disclosed. The method comprises: connecting the memory cells to a first and second sets of wordlines such that, for a row of the memory cell array, the memory cells of the row are separately connected to at least a wordline from the first set and another wordline from the second set; connecting the memory cells of a column to a bitline; upon receiving a display control signal and a set of data, generating a wordline control signal having a first value and a second value; activating the wordlines from the first set; delivering the data to the memory cells connected to the activated wordlines; deactivating the wordlines from the first set; activating wordlines from the second set; and delivering the data to the memory cells connected to the activated wordlines.

In yet another embodiment of the invention, a method for driving an array of micromirrors of a spatial light modulator used in a display system, wherein the spatial light modulator comprises an array of micromirrors, each of which being associated with an electrode of an array of electrodes, each electrode being connected to a memory cell of an array of memory cells is disclosed. The method comprises: connecting the memory cells to a first and second sets of wordlines such that, for a row of the memory cell array, the memory cells of the row are separately connected to at least a wordline from the first set and another wordline from the second set; connecting the each memory cells of a column to a bitline; upon receiving a display control signal; generating a wordline control signal that selectively activates and the deactivates the wordlines; updating the memory cells of a row, further comprising: loading a first set of data for the memory cells connected to the first wordline of the row; activating the first wordline delivering the first set of data to the memory cells connected to the activated first wordline; deactivating the first wordline; loading a second set of data for the memory cells connected to the second wordline; activating the second wordline; and delivering the data to the memory cells connected to the activated second wordline.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The present invention provides a control technique and an integrated driver for controlling display systems employing spatial light modulators.

The integrated driver comprises multiple buses interconnected with bridges for interfacing functional modules. The integrated driver provided sufficient control signals and image data for the spatial light modulator so as to display desired images and videos.

Communications between functional modules within a bus are performed through the buses and controlled by bus controllers attached to the buses. Communications between functional modules connected to different buses are controlled by the bus controllers of the buses and bridges interconnecting the buses. The bridge transmits control signals from a predefined master bus to predefined slave buses and blocks control signals form a slave bus to the master bus. However, image data can be exchanged between the master and a slave buses through the bridge. In this way, communications within a bus is localized and isolated from other functional modules. Operations of the functional modules in a bus do not impact on other functional modules of other buses.

The integrated driver can be a single semiconductor chip having multiple circuits corresponding to the functional modules, buses and bridges. Alternatively, it can be a series of computer-executable instructions stored in a computer-readable medium, such as volatile and non-volatile memory of a computer provided for controlling the display system.

Figure 1:
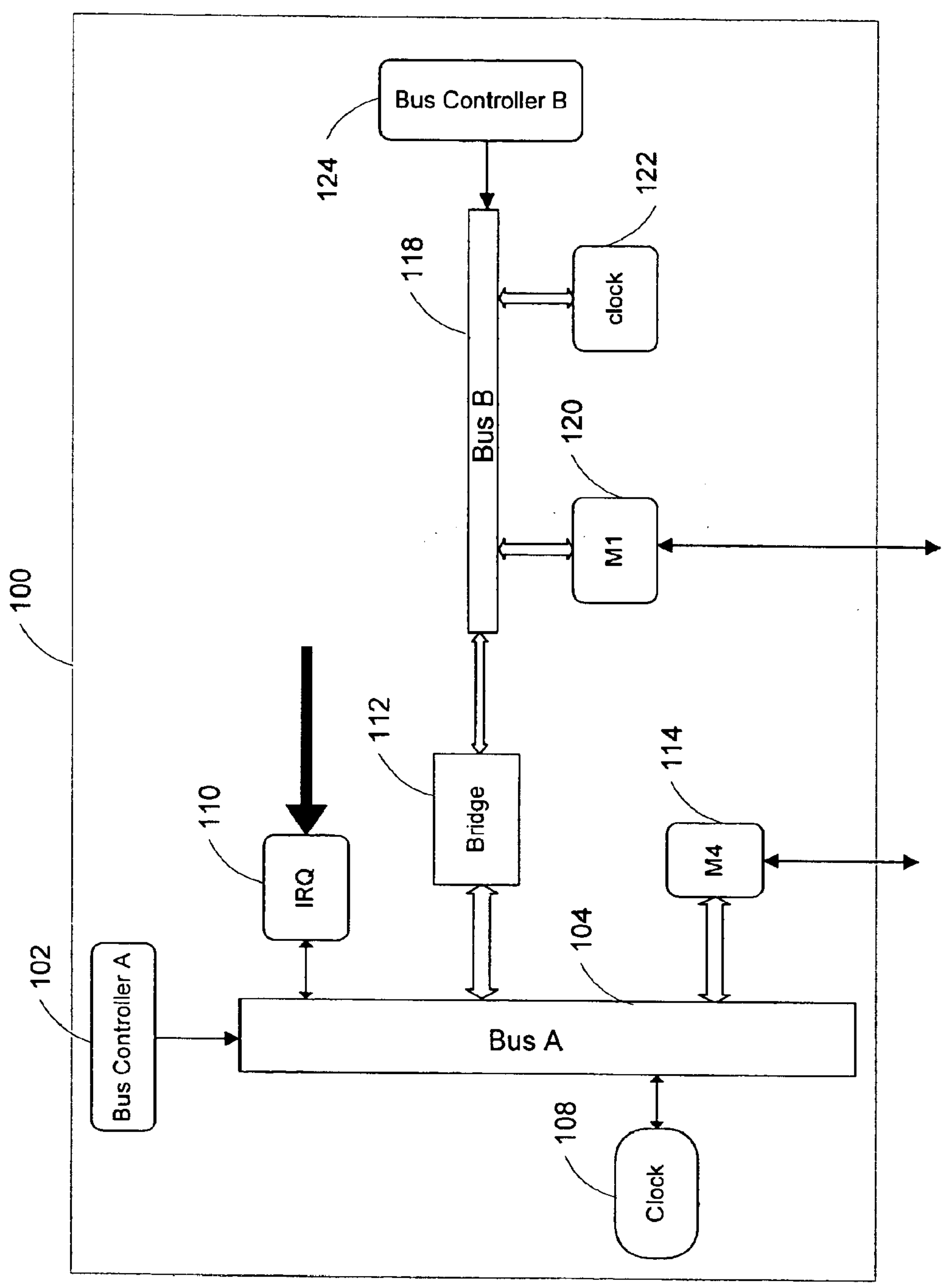
FIG. 1 is a block diagram illustrating an integrated driver having two separate buses linked via a bridge and multiple functional modules connected thereto.

Referring to FIG. 1, an exemplary integrated driver for use in digital display systems employing spatial light modulators is illustrated therein. The integrated driver comprises multiple buses, such as bus A 104 and bus B 118. The structures and characters (e.g. bandwidth) of the buses may or may not be the same. As an example, bus A and bus B are standard AHB buses. Bus A has a width of 32 bits, while bus B has a width of 128 bits. The width of the bus is selected based upon the functional modules connected to the bus and data traffic in the bus. For example, those functional modules responsible for controlling and/or initializing other functional modules or components of the display systems (e.g. light source and color filter) generally do not put stringent requirement on the bandwidth. Therefore, a bus with a small width, e.g. 32 bits may be suitable to interface those functional modules.

There is another type of functional modules that are responsible for processing data, such as receiving image data, transforming image data from one standard format to another format and storing and retrieving processed image data. These functional modules generally require a bus with a large bandwidth, such as 128 bits.

In consideration of their distinct functions, functional modules are connected to separate buses. Specifically, functional modules for controlling and/or initializing other functional modules or components of the display systems are connected to one bus, such as bus A 104. While the functional modules responsible for processing data are connected to another bus, such as bus B 118. The two buses are interconnected through a bridge, such as bridge 112.

The bus interfaces the functional modules connected therewith. The communication among the functional modules via the bus is controlled by a bus controller, such as bus controller A 102 for bus A and bus controller B 124 for bus B. When a functional module sends a control signal or a data into the bus, the bus controller determines the target functional module responding to the signal or and the data. The other functional modules ignore the signal or the data upon receiving. When more than one functional module simultaneously request for sending signal or data to the bus, the bus controller determines the priority order for those modules.

Communications between functional modules connected to separate buses are accomplished via the bus controllers and a bridge interconnecting the two buses. According to the invention, the bridge passes a transaction from a predefined mater bus to a predefined slave bus, and blocks a control signal from a slave bus to the master bus. However, the bridge allows exchange of data between the linked buses. As an example, assuming bus A is the master bus and bus B is a slave bus, module M4 114 sends a control signal targeted for module M1 120. The control signal is sent to bus A 104. The bus controller A determines that the transaction on the bus A is for a functional module (M1) not connected to the bus A. The bus controller instructs bridge 112 to pass the transaction to bus B 118. Because the transaction is originated from the master bus, then bridge transmits the control signal to the bus B. Upon detecting the control signal in bus B, bus controller B 124 determines that functional module M1 is responsible for the control signal. The bus controller B then instructs module M1 to respond to the control signal and other modules to ignore the control signal.

In the same example, further assuming that the control signal is to request M1 to send data to a module in bus A, the module M4 prepared the requested data and delivers the prepared data to the bus B. The bus controller B instructs the bridge to transmit the data to bus A. Upon detecting the receiving of the data by the bus A, the bus controller A determines the targeted functional module and instructs the determined module to respond to the transmitted data.

As can be see, the bridge localizes the communications among the modules within the bus to which the modules are connected, and isolates the communications within separated buses from each other. As an advantage, operations of the modules of one bus will not impact on the operations of the modules of the other buses.

Clocks may be provided for the buses, such as clock 108 for the bus A and clock 122 for the bus B. The clocks provide synchronization for the functional modules connected to the buses. Alternatively, one clock is provided for the master bus, such as the bus A, and no clock is provided for the bus B. In this situation, clock 108 in the bus A also provides synchronization for the bus B, and the functional modules of the bus B operate according to clock 108 in the bus A. Alternatively, clocks 108 and 122 both are provided for the buses A and B, and clock 122 for the bus B is a derived clock of clock 108. In fact, both clocks 108 and 122 can be derivatives of a central clock, such as central clock 230 in FIG. 5.

The functional modules may respond to external signals or system level control signals originated from a functional module within the integrated driver without using the buses. For example, IRQ module 110 receives and processes interrupt requests originated from either outside the integrated driver or a functional module within the integrated driver. M4 and M1 modules can receive and respond to external control signals and data (e.g. image data).

Figure 2:
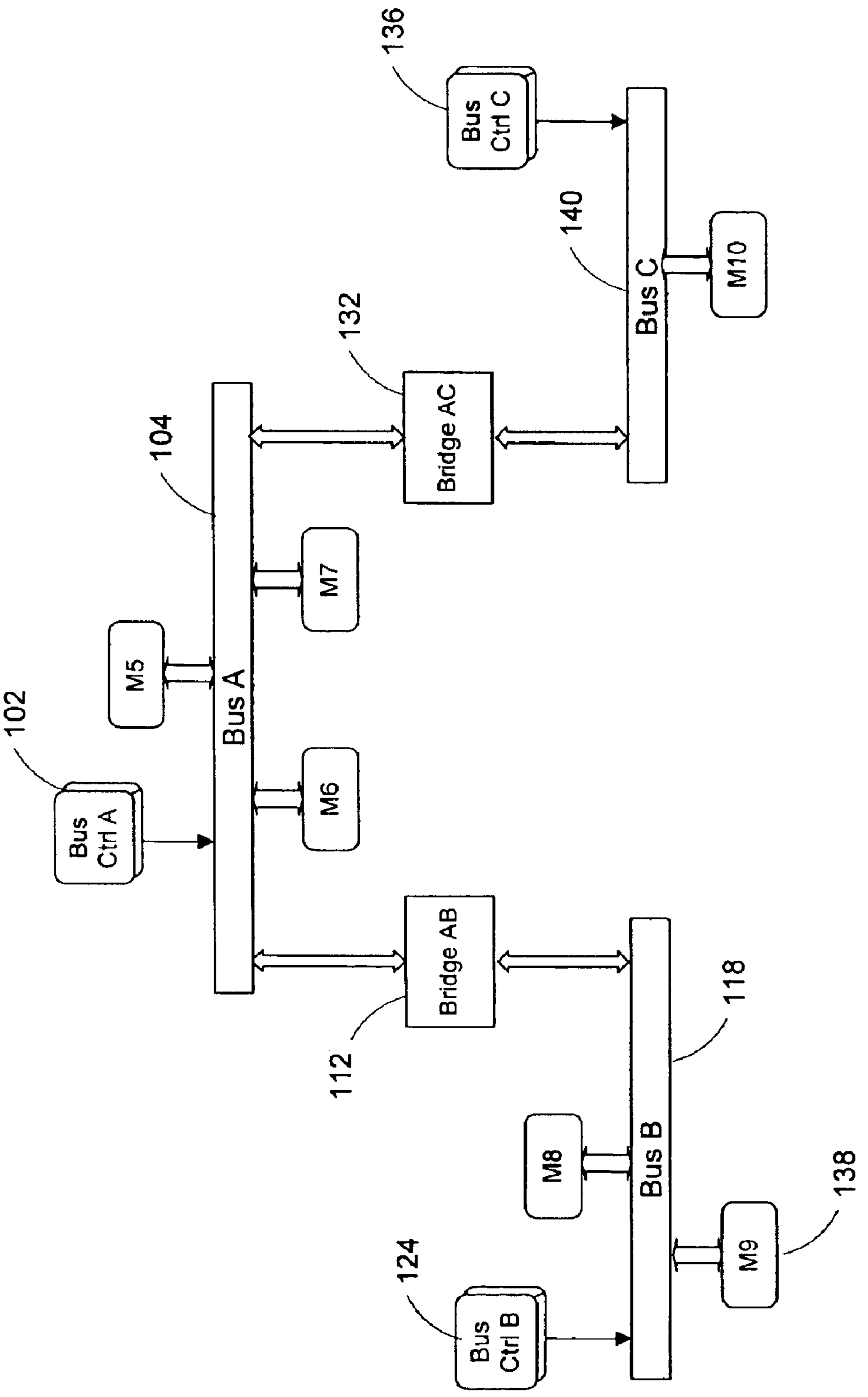
FIG. 2 is a block diagram illustrating another integrated driver having multiple buses linked via bridges.

Another integrated driver having a topological equivalent bus structure to that in FIG. 1 is illustrated in FIG. 2. Referring to FIG. 2, the integrated driver comprises three buses A, B and C with bus A as the master bus. Bus controller A 102 and functional modules M5, M6 and M7 are connected to the bus A. Communications among the modules M5, M6 and M7 are controlled by the bus controller A 102. The bus A is linked to bus. B 118 via bridge AB 112. Functional modules M8 and M9 and bus controller B 124 are connected to the bus B. Bus C 140 is linked to the bus A via bridge AC 132. And communications within the bus C are controlled by bus controller C 136 that is connected to the bus C.

Bridge AB 112 transmits control signal only from bus A to bus B, while transmits data between bus A and bus B. Similarly, bridge AC 132 transmits control signals only from the bus A to the bus C, while it allows data exchange between the buses A and C.

The integrated driver of the present invention can be implemented in many applications in controlling digital display systems using spatial light modulators (e.g. micromirror arrays, liquid crystal display, liquid and crystal on silicon) that operate in binary states and other type of display systems not using spatial light modulators such as organic light-emitting diodes that operate in binary states. In the following, the present invention will be described with embodiments in which micromirror is employed in the display systems. Sequential-color-filed and pulse-width-modulation techniques are adopted for producing color images. It will be appreciated that the following discussion is for demonstration and simplicity purposes only. It should not be interpreted as a limitation.

Figure 3:
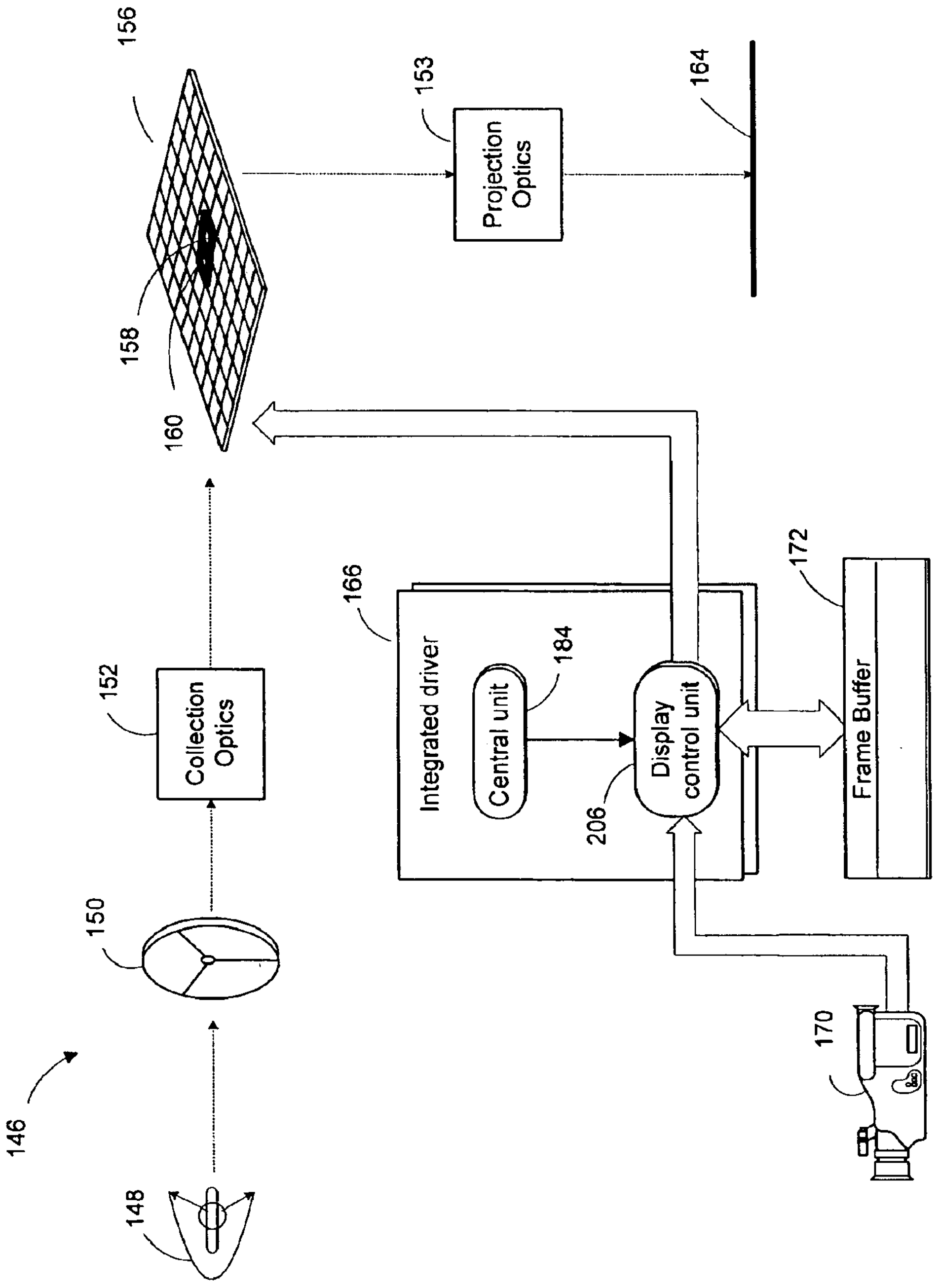
FIG. 3 is a block diagram illustrating an exemplary display system employing a spatial light modulator and an integrated driver.

Referring to FIG. 3, a display system using a spatial light modulator having micromirrors is illustrated therein. In its basic configuration, display system 146 comprises light source 148, color filter 150, collection lens 152, spatial light modulator 156, projection lens 153, display target 164, integrated driver 166 and frame buffer 172 that can also be a part of the integrated driver.

Light source 148 provides light for the system. The light beam passes through the color filter and collection lens and shines on the spatial light modulator. The spatial light modulator modulates the light beam under control of integrated driver 166 according to the image data. The modulated light beam is projected on the display target by the projection lens.

Figure 4A:
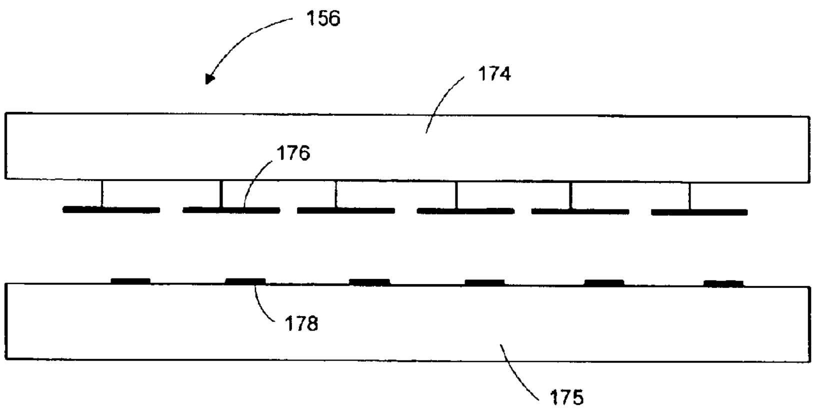
FIG. 4*a* is a cross-sectional view of a simplified spatial light modulator having a micromirror array formed on a glass substrate and an array of electrodes formed on a semiconductor substrate.

A portion of a cross-sectional view of an exemplary spatial light modulator 156 is illustrated in FIG. 4*a*. Referring to FIG. 4*a*, spatial light modulator comprises an array of micromirrors (only a portion of a row of the array is illustrated) formed on glass substrate 174 that is transmissive to light from the light source. Each micromirror, such as micromirror 178 can rotate relative to the glass substrate in response to an electrostatic field established between the mirror plate of the micromirror and an electrode, such as electrode 178 of an electrode array that is formed on semiconductor substrate 175. The electrostatic field is controlled by the voltage of the electrode, given that the voltage of the mirror plate is fixed. The voltage of the electrode is associated with the instant data stored in the memory cell connected to the electrode, which is more clearly illustrated in FIG. 4*b*.

Figure 4B:
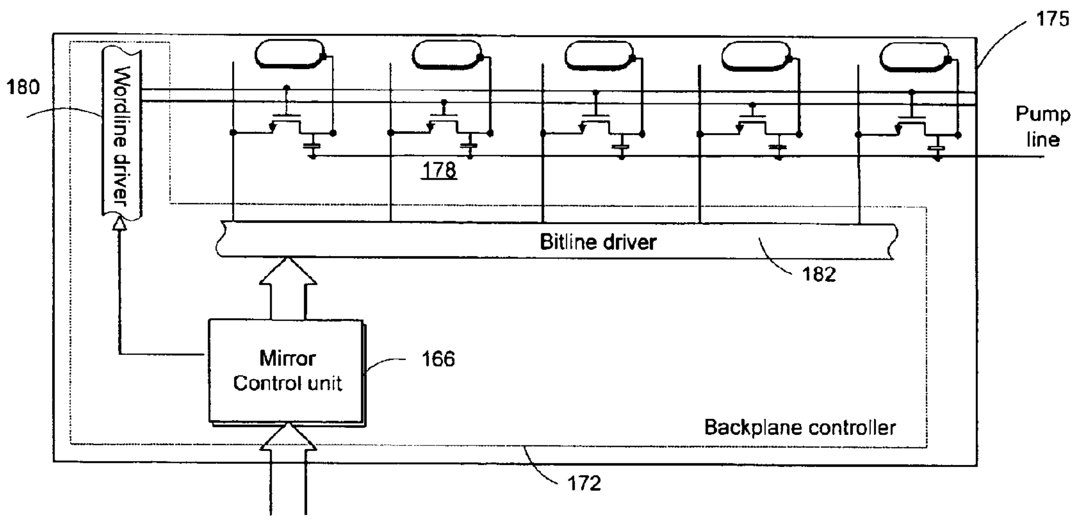
FIG. 4*b* is a block diagram schematically illustrating the semiconductor substrate of FIG. 4*a;*

Referring to FIG. 4*b*, semiconductor substrate 175 comprises an array of electrodes (only a portion of the array is illustrated for simplicity) and an array of memory cells, each of which is connected to the electrode. In this example, the memory cell is a "charge-pump-pixel cell" that comprises a transistor and a capacitor. The source of the transistor is connected to a bitline for updating the memory cell. The gate of the transistor is connected to a wordline for activating the memory cell. The drain of the transistor is connected to a plate of the capacitor and forms a node. The node is connected to the electrode. In an embodiment of the invention, the other plate of the capacitor is connected to a pump line for pumping up the voltage of the node. Detailed description is set forth in U.S. patent application Ser. No. 10/340,162 to Richards, filed Jan. 10, 2003, the subject matter being incorporated herein by reference. Of course, other type of memory cells, such as DRAM, latch or SRAM can also be used.

The semiconductor substrate further comprises wordlines and bitlines connected to the memory cells for updating the memory cells. In the embodiment of the invention, a plurality of wordlines is provided to the memory cells of a row of the memory cell array. Specifically, the memory cells of the row of the memory cell array are divided into groups. Memory cells of the same group are connected to the same wordline, while the memory cells of different groups are connected to separate wordlines. Detailed description is set forth in U.S. patent application Ser. No. 10/407,061 to Richards, filed Apr. 2, 2003, the subject matter being incorporated herein by reference.

The wordlines are connected to wordline driver 180 and bitlines are connected to bitplane driver 182. The wordline and bitline drivers and the pump line are controlled by mirror control unit 166. In operation, the mirror control unit obtains control signals and bitplane data from integrated driver 166 in FIG. 3 and controls the wordline and bitline drivers to update the memory cells according to bitplane data, which will be discussed in detail afterwards. In the embodiment of the invention, the mirror control unit, the bitline and wordline drivers are formed on the same semiconductor substrate 175. Alternatively, the mirror control unit, or a portion of the mirror control unit can be formed on a separate substrate, though less preferred.

Figure 5:
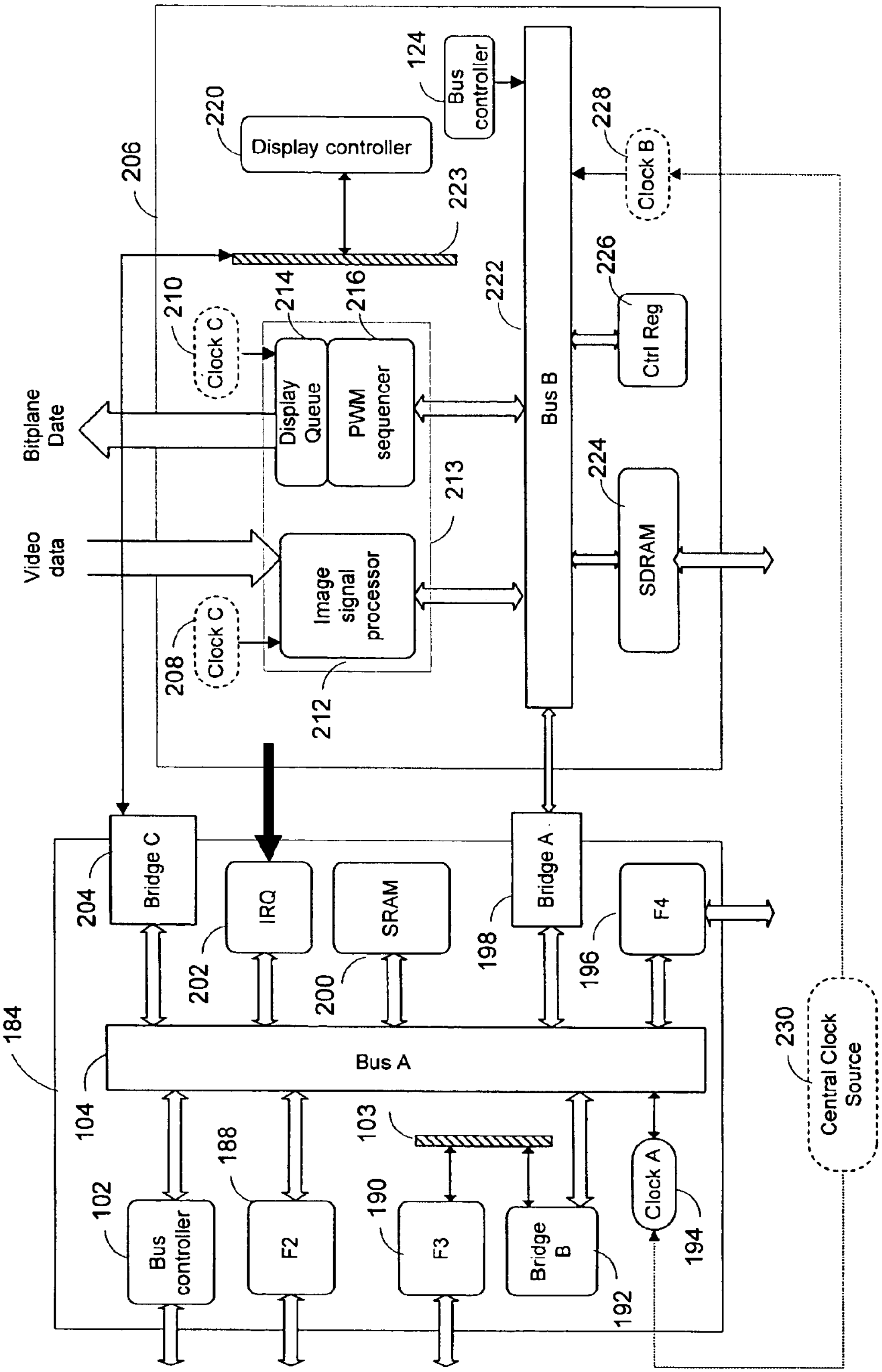
FIG. 5 is a block diagram that schematically illustrates an exemplary integrated driver used in the display system of FIG. 3.

The operation of the spatial light modulator is controlled by the integrated driver. An exemplary integrated driver is illustrated in FIG. 5. Referring to FIG. 5, two buses are provided. Bus A 104 and the functional modules connected thereto form a central unit 184 that is responsible for controlling and initializing other functional modules of the integrated driver and other components (e.g. light source, optical lens and color filter) of the display system in FIG. 3. Bus B 222 and functional modules connected thereto form a display control unit 206. The buses A and B are linked via bridge 198.

The central control unit further comprises functional modules IRQ 202, SRAM 200, Clock A 194, bus controller 102 and other necessary modules. Moreover, the central control unit may comprise another bus (bus 103) and functional modules connected thereto and bridge 192 linking buses 103 and 104.

The display control unit further comprises image data processing unit 213, SDRAM interface 224, control register 226, bus controller 124, bus 223 and display controller 220 that is connected to bus 223. The image data processing unit further comprises image signal processor 212, display queue 214 and PWM sequencer 216. The display control unit may also comprise clocks 208, 210 and 228. Of course, not all of these clocks are necessary. In an embodiment of the invention, clock 228 of the bus B is a derivative of clock 194 of the bus A. In another embodiment of the invention, clocks 228 and 194 are derivatives of central clock source 230, which may or may not be installed within the integrated driver.

In the following, operations of the integrated driver and the spatial light modulator will be discussed in the exemplary display system, in which the spatial light modulator in FIGS. 4*a* and 4B and the integrated driver in FIG. 5 are employed. It will be understood by those skilled in the art that the following discussion is for demonstration purposes only. It should not be interpreted as a limitation. For example, the integrated driver can be used to control display systems employing other type of spatial light modulators that operate in binary states.

At the beginning of the display application, for example, when the user turns the power on, central control unit 184 of the integrated driver starts to initialize the other functional modules, such as functional modules of the bus B in the integrated driver. For example, the central control unit loads default parameters (e.g. from an on-board RAM) and delivers those default parameters to image signal processor 212 of the image data processing unit in the integrated driver. Meanwhile, the central control unit synchronizes the components, such as the color filter and the light source of the display system.

After the initialization, the central control unit instructs the image data processing unit to receive image data of a standard format and processes the received data into bitplane data. Specifically, image signal processor 212 of the image data processing unit retrieves data of images or videos from image source 170 in FIG. 3 and converts the retrieved image data into bitplane data. For example, the image source provides standard RGB data of videos. The image signal processor retrieves the RGB data and applies a series of predefined data processes, such as, PWM encoding and transpose to the retrieved RGB data. The transpose operation converts the pixel data of the videos into bitplane data according to the configuration of the memory cells and wordlines. Because the memory cells of a row of the memory cell array as shown in FIG. 4*b* are connected to dual wordlines, the converted bitplane data are in compliance with such memory cells configuration. Specifically, because the odd numbered and even numbered pixels are connected to separate wordlines as shown in FIG. 4*b*, the image signal processor prepares the bitplane data such that the bitplane data for the odd numbered memory cells are output and stored continuously, and the bitplane data for the even numbered memory cells are output and stored continuously. The bitplane data are then delivered to the bus B.

SDRAM interface 224 collects the bitplane data and stores the collected bitplane data into a storage medium, such as frame buffer 172 in FIG. 1. After certain amount (e.g. a frame) of the bitplane data is collected and stored in the frame buffer, PWM sequencer 216 retrieves the bitplane data from the frame buffer through the bus B and SDRAM interface and passes the retrieved data onto display queue 214. At this stage, the integrated driver has prepared the bitplane for updating the memory cells of the spatial light modulator so as to drive the micromirrors to display the video frame.

Figure 6:
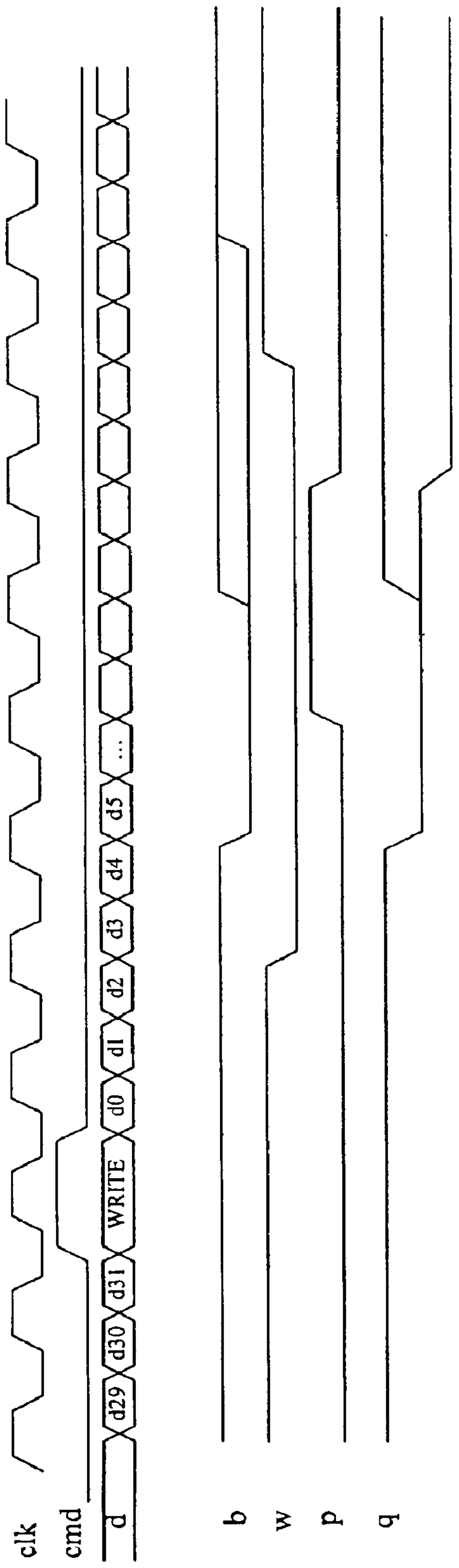
FIG. 6 illustrates sequences of exemplary signals used for updating the memory cells of the spatial light modulator.

Referring again to FIG. 4*b*, mirror control unit 166 retrieves the bitplane data in the display queue in FIG. 5 and receives a number of control signals, such as a sequence of clock signals and command signals from the integrated driver (exemplary clock and command signals are illustrated in FIG. 6, which will be discussed afterwards). With the control signals, the mirror control unit sends activations signals to the wordline driver to sequentially activate the wordlines and delivers corresponding bitplane data to the bitlines for updating the memory cells. For example, in order to update the odd (or even) numbered memory cells, the mirror control unit sends an activation signal to the wordline connecting the odd (or even) numbered memory cells and passes the bitplane data for the odd (or even) numbered memory cells to the bitlines. Alternatively, the bitplane data for the odd and even numbered memory cells can be passed to the bitlines simultaneously. Specifically, the mirror control unit sends a first activation signal to the wordline driver to activate one of the wordlines (e.g. the wordline connecting the odd numbered memory cells) of the row and passes the bitplane data for both even and odd numbered memory cells to the bitlines. Upon receiving the first activation signal, the wordline driver activates the designated wordline and thus, the memory cells (e.g. the odd numbered memory cells) connected to the activated wordline. The activated memory cells are then updated using the corresponding bitplane date (e.g. the bitplane data for the odd numbered memory cells). Then the mirror control unit sends a second activation signal to the wordline driver to activate the other wordline (e.g. the wordline connecting the even numbered memory cells) of the row. Upon receiving the second activation signal, the wordline driver activates the other wordline and thus, the memory cells (e.g. the even numbered memory cells) connected to the activated wordline. The activated memory cells are updated using the corresponding bitplane date (e.g. the bitplane data for the even numbered memory cells). Other activation and updating methods may also be used.

FIG. 6 illustrates a portion of the signals used in updating the memory cells. Referring to FIG. 6, CLK is a bus clock signal. In the embodiment of the invention, data are sampled and loaded on the rising and falling edges of the CLK signal during a data input cycle. CMD is a control signal. CMD=0 on the rising edge of the CLK signal indicates a data cycle (shift data in or out). D represents data signals. B is the bitplane signal. W is the wordline signal. P is the pump line signal and Q is the signal at the node of the memory cell. Table 1 lists the operations of the memory cell at different states.

TABLE 1

| B | W | P | Q | Status |
|---|---|---|---|---|
| 1 | 1 | 0 | $V_{QL}/V_{QH}$ | Row not selected, Q holds stored value |
| 1 | 0 | 0 | $V_{DD}$ | Q pulled up to $V_{DD}$ |
| 0 | 0 | 0 | $V_{TP}$ | Prepare to clamp Q during rising edge on P |
| 0 | 0 | 1 | $V_{TP}$ | P rises, Q prevented from rising above well potential |
| 0/1 | 0 | 1 | $V_{TP}/V_{QH}$ | Begin write to cell; Q pulled up to $V_{DD}$ or stays at $V_{TP}$ depending on bitline value |
| 0/1 | 0 | 0 | $V_{QL}/V_{QH}$ | Q pumped down or held at $V_{DD}$ depending on bitline state |
| 0/1 | 1 | 0 | $V_{QL}/V_{QH}$ | Wordline deselected, write complete |

wherein $V_{DD}$ is a low voltage level for the wordline and bitline. $V_{DDE}$ is a high voltage for the pump line. $V_{QL}$ and $V_{QH}$ are voltage levels for the node Q, wherein $V_{QL}=V_{TP}-V_{DDE}$ and $V_{TP}$ is the threshold voltage of PMOS cell transistor. $V_{QH}=V_{DD}$. Q may also takes on intermediate values between $V_{QL}$ and $V_{QH}$ during the write cycle.

The bitplane data in each memory cell determines the voltage of the electrode connected to the node of the memory cell. Consequently, the electrostatic field between the mirror plate of the micromirror and the electrode is updated.

Within a frame period, such as 16.6 milli seconds all bitplane data are loaded into the memory cells. That is, each memory cell is updated a number of times with the number equal to the total number of bitplanes. The total number of bitplanes is determined by a product of the number of bitplanes of each primary color (e.g. red, green or blue) and the total number of the color segments in the color filter. For example, the color filter comprises three segments, red, green and blue. And the grayscale of the image according to the pulse-width-modulation technique is represented by 8 bits. Then the number of bitplane for each primary color is 8, and the total number of bitplanes is 24 (24=8×8). During the frame period of 16.6 milliseconds, the memory cells and accordingly, the micromirrors are updated 24 times. As a result, a color image is presented to the viewer.

In addition to control the spatial light modulator, the integrated driver also controls the components of the display system, such as the light source, the color filter and the optical elements. The control may be initiated by the viewer, or alternatively by the other functional modules of the integrated driver. For example, the integrated driver can synchronizes the light source, the color filter and the spatial light modulator so as to produce desired images or videos. The integrated driver may also adjust the optical elements, such as collection and projections lens 152 and 153 in response to an instruction from the viewer.

Other than implementing the embodiments of the present invention in data converter 120 in FIG. 1, the embodiments of the present invention may also be implemented in a microprocessor-based programmable unit, and the like, using instructions, such as program modules, that are executed by a processor. Generally, program modules include routines, objects, components, data structures and the like that perform particular tasks or implement particular abstract data types. The term "program" includes one or more program modules. When the embodiments of the present invention are implemented in such a unit, it is preferred that the unit communicates with the controller, takes corresponding actions to signals, such as actuation signals from the controller.

The integrated driver of the present invention can be implemented in a single semiconductor chip having multiple circuits corresponding to the functional modules, buses and bridges. Alternatively, the integrated driver can be implemented in a microprocessor-based programmable unit, and the like, using instructions, such as program modules, that are executed by a processor. Generally, program modules include routines, objects, components, data structures and the like that perform particular tasks or implement particular abstract data types. The term "program" includes one or more program modules. The program of the integrated driver can be stored in volatile or non-volatile memories. When the embodiments of the present invention are implemented in such a unit, it is preferred that the unit communicates with the spatial light modulator and other components of the display system, such as the light source, the color filter and optical elements. The communication can be accomplished through standard interfaces to transmit control signals and image data.

It will be appreciated by those of skill in the art that a new and useful integrated driver for use in digital display systems having spatial light modulators has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

I claim:

1. A method for driving an array of micromirrors of a spatial light modulator used in a display system, wherein the spatial light modulator comprises an array of micromirrors, each of which being associated with an electrode of an array of electrodes, each electrode being connected a memory cell of an array of memory cells, the method comprising:

connecting the memory cells to a first and second sets of wordlines such that, for a row of the memory cell array, the memory cells of the row are separately connected to at least a wordline from the first set and another wordline from the second set;

connecting the each memory cells of a column to a bitline;

upon receiving a display control signal and a set of data, generating a wordline control signal having a first value and a second value;

activating the wordlines from the first set;

delivering the data to the memory cells connected to the activated wordlines;

deactivating the wordlines from the first set;

activating wordlines from the second set; and delivering the data to the memory cells connected to the activated wordlines.

2. The method of claim 1, further comprising:

producing a pump signal; and delivering the pump signal to the pump line.

3. A method for driving an array of micromirrors of a spatial light modulator used in a display system, wherein the spatial light modulator comprises an array of micromirrors, each of which being associated with an electrode of an array of electrodes, each electrode being connected a memory cell of an array of memory cells, the method comprising:

connecting the memory cells to a first and second sets of wordlines such that, for a row of the memory cell array, the memory cells of the row are separately connected to at least a wordline from the first set and another wordline from the second set;

connecting the each memory cells of a column to a bitline;

upon receiving a display control signal;

generating a wordline control signal that selectively activates and the deactivates the wordlines;

updating the memory cells of a row, further comprising:

loading a first set of data for the memory cells connected to the first wordline of the row;

activating the first wordline delivering the first set of data to the memory cells connected to the activated first wordline;

deactivating the first wordline;

loading a second set of data for the memory cells connected to the second wordline;

activating the second wordline; and delivering the data to the memory cells connected to the activated second wordline.

4. The method of claim 3, further comprising:

providing a pump signal; and delivering the pump signal to the pump line.

5. The method of claim 3, further comprising:

updating memory cells.

* * * * *